United States Patent
Galotto et al.

(10) Patent No.: US 8,274,890 B2
(45) Date of Patent: Sep. 25, 2012

(54) METHOD AND DEVICE FOR DISTRIBUTING CONNECTIONS TOWARDS A RECEIVING DOMAIN

(75) Inventors: Carmine Galotto, Pagani (IT); Salvatore Nocerino, Castelcisterna (IT); Aniello Donnarumma, Scafati (IT); Lucia Savarese, Salerno (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 12/607,742

(22) Filed: Oct. 28, 2009

(65) Prior Publication Data

US 2011/0007641 A1 Jan. 13, 2011

(30) Foreign Application Priority Data

Jul. 8, 2009 (WO) .............. PCT/EP2009/058708

(51) Int. Cl.
*H04J 1/16* (2006.01)
(52) U.S. Cl. ....................................... 370/231
(58) Field of Classification Search .......... 370/229, 370/230, 230.1, 231, 235, 237, 238, 238.1, 370/351, 352, 355, 389, 400, 428, 464, 465
See application file for complete search history.

(56) References Cited

U.S. PATENT DOCUMENTS

| | | | |
|---|---|---|---|
| 5,951,694 A | | 9/1999 | Choquier |
| 6,195,354 B1 * | | 2/2001 | Skalecki et al. ......... 370/395.32 |
| 6,549,513 B1 * | | 4/2003 | Chao et al. .................... 370/227 |
| 2003/0061359 A1 | | 3/2003 | Kimura |
| 2005/0135256 A1 * | | 6/2005 | Ball et al. ....................... 370/238 |
| 2005/0160133 A1 | | 7/2005 | Greenlee |
| 2005/0226251 A1 * | | 10/2005 | Krzanowski et al. .... 370/395.41 |
| 2006/0182035 A1 * | | 8/2006 | Vasseur ......................... 370/238 |

FOREIGN PATENT DOCUMENTS

WO WO 99/30460 A2 6/1999

* cited by examiner

*Primary Examiner* — Obaidul Huq

(57) ABSTRACT

A method is described for distributing a plurality of connections towards a receiving domain. The connections are established over at least two connection entities. Each connection entity handles traffic being associated to the connections. An initial procedure distributes the connections among the connection entities. First, a traffic load associated with the connections over each of the connection entities is determined. Further, the traffic load associated with the connections over at least two connection entities is compared. Finally a procedure for adapting the distribution of the connections according to the comparison is invoked.

14 Claims, 5 Drawing Sheets

METHOD AND DEVICE FOR DISTRIBUTING CONNECTIONS TOWARDS A RECEIVING DOMAIN

TECHNICAL FIELD

The present invention relates to a method for distributing connections towards a receiving domain. A device and a program embodying the invention are also described.

BACKGROUND

A directory is a set of objects organized in a logical and hierarchical manner. An example of a directory is a telephone directory, which consists of a series of names, e.g. of persons or organizations, organized alphabetically, with each name having an address and phone number attached. A directory can be regarded as a tree of entries also known as directory information tree, or simply directory tree, due to the fact that data is represented in a hierarchical tree-like structure. The data in a directory can be managed by directory services.

Modifications and queries in a directory can be made using application protocols e.g. the Lightweight Directory Access Protocol (LDAP). One or more servers may contain the data making up the directory. In case of a distributed directory, regardless of which server a client connects to, it has the same view of the directory; a name presented to a server refers to the same entry it would refer to on another server.

There is an increasing interest in applications, especially in telecommunications networks, which could benefit from the capabilities offered by a central database, hosted e.g. on a server database. Towards this server database more than one client may need to be connected over a communication network. In this case for each client-server pair a dedicated connection is established.

A client can be any telecom node or computer or board or apparatus that communicates towards a server database through e.g. an LDAP based service. An LDAP Server database is any directory that offers the possibility to read/write data through an LDAP based service.

A client node hosting several clients uses a pool of hardware boards over which the LDAP connections are established towards the remote LDAP server databases. The hardware boards are shared among the clients using them and thus one hardware board can host connections between multiple clients and servers and multiple connections between a single client-server pair.

Once a connection is established over a hardware board it remains on that board until an order of disconnection is given or until an event occurs that breaks the connection. So, for example, one or more established connections over a hardware board are usually not moved from that board, unless a hardware or network failure occurs. That might lead to an inefficient use of the hardware resources.

If a new hardware board is introduced into the pool of existing hardware boards then this new board will only be used to host new connections towards the server database. Within the pool there may be overloaded, hardware boards. Also, if more than one board suddenly becomes unavailable then the connections hosted by them can be transferred to other boards within the pool. Nevertheless once the boards which became unavailable are available again then they will not be used to host existing connections again but they will only be used for new connections. In general there is the risk that a high number of connections are established over a few boards while having other boards available but unused. This can create problems of congestion or connections being dropped due to overload or unavailability of hardware boards. The problem can become even bigger in case the boards used in the pool have different capacities and/or performance. Using lower capacity boards while leaving higher capacity ones unused is an inefficient usage of resources.

SUMMARY

It is an object of the present invention to obviate the above disadvantages and provide an advantageous method for distributing connections between clients and a receiving domain.

According to the invention, the method described in an independent is performed. Furthermore, the invention is embodied in a device and a program as described in the further independent claims. Embodiments of the invention are described in the dependent claims.

A method for distributing connections towards a receiving domain is proposed. The connections are established over at least two connection entities. Each connection entity handles traffic which is associated to the connections. An initial procedure distributes the connections among the connection entities. According to the method, first, for each of the connection entities, a traffic load associated with the connections over the respective connection entity is determined. Further, the traffic load associated with the connections over the at least two connection entities is compared. Finally a procedure is invoked for adapting the distribution of the connections according to the comparison.

Furthermore, the invention can be embodied in a device for distributing connections towards a receiving domain. The connections are established over at least two connection entities. Each connection entity handles traffic which is associated to the connections. An initial procedure distributes the connections among the connection entities. The device comprises an interface which is adapted to obtain, for each of the connection entities, a traffic load associated with the connections over the respective connection entity. Further the device comprises a comparator which is adapted to compare the traffic load associated with the connections over at least two connection entities, obtained by the interface. Further the device comprises a processor which is adapted to invoke a procedure for adapting the distribution of the connections according to the comparison performed by the comparator.

The method can also be embodied in a program which is, for example, stored on a data carrier or loadable into a processing system of a mobile device, e.g. as a sequence of signals.

The proposed method and devices allow an advantageous distribution of connections towards a receiving domain while avoiding inefficient hardware usage.

The foregoing and other objects, features and advantages of the present invention will become more apparent in the following detailed description of preferred embodiments as illustrated in the accompanying drawings.

DETAILED DESCRIPTION

Figure 1:
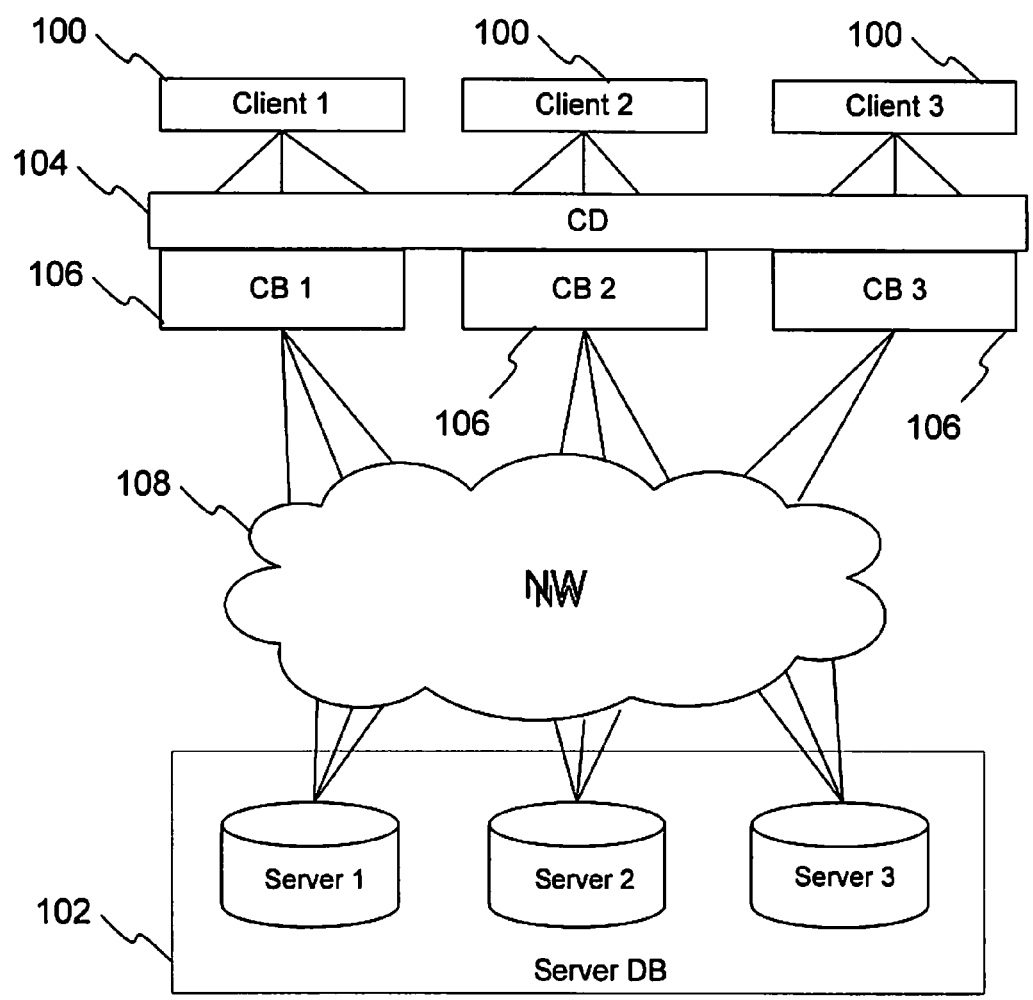
FIG. 1 shows an embodiment of a client-server arrangement

FIG. 1 shows an embodiment of a client-server arrangement. The servers form a server database 102. Service requests from the clients 100 towards the server database 102 are transmitted over connections which are established between the clients and the server database. The connections are first established towards a connection distributor 104 which distributes them to connection boards 106 which are responsible for establishing the connections further towards the server database 102. The connection boards 106 can be implemented as hardware, in which case they can be called hardware boards, or as virtual hardware platforms implemented e.g. in software. Regardless of their implementation the connection boards can be also referred to as connection entities.

The connections over the connection boards 106 can be initially distributed according to the traffic data volume capacity of each board. For example, a connection board 106 handling lower traffic data volume than the other boards can be selected to host new connections. The connection boards 106 can be either of the same type, i.e. the have same or similar capacity or processing power or be of different types i.e. they have different capacities or processing power. The connections are further established from the connection boards 106 towards the server database 102 over a communication network 108 which can be, for example, an Internet protocol (IP) based network. In case of an IP based network an LDAP based service can be used to communicate service requests between the clients 100 and the server database 102 over LDAP connections established between them. The server database 102 can be considered as a receiving domain as it receives connections from the client domain, i.e. the connection boards handle traffic between domains defined by the connection endpoints.

As mentioned before, once the connections are established they are not moved unless a disconnection order is given or an unexpected event, like a hardware failure, occurs.

According to the proposed method, a re-distribution mechanism is provided that allows an efficient re-distribution of existing connections between a client and a server and furthermore an efficient distribution of new connections being established between a client and a server. The method can therefore be also referred to as a "re-distribution method". It can be configured to be launched automatically e.g. periodically in order to maintain a good connection distribution of the connections throughout the operation of a client-server arrangement. The proposed method is not limited to the client-server networking architecture but can also be applied in cases of peer-to-peer networking architecture.

The method allows the optimization of the distribution of connections among the connection boards by moving them from highly or over-loaded to under-loaded boards. A connection board is considered highly or over-loaded if it is handling the most total traffic data volume of all the available boards. Accordingly an under-loaded connection board is handling the least total traffic data volume of the available boards. The distribution of the connections among the connection boards is achieved without affecting the ongoing operations as will be described later. The target of this mechanism is to balance, as much as possible, the traffic volume over all the functioning boards which are available. In order to identify which connections can be moved a target value can be set. According to this value the difference between the total traffic data volume handled by the over-loaded and the under-loaded boards is minimized by moving one or more connections among the hardware boards. The total traffic data volume of a board is obtained by summing all traffic data volumes assigned to the connections hosted by that board.

The traffic data volume is a measure of the total load on a resource. In the case of the invention the traffic data volume provides an indication of the amount of data which is handled by the connection boards due to hosting connections between the clients and the server database. In the case of a peer-to-peer networking architecture the traffic data volume provides an indication of the amount of data exchanged between the peers. For the description which follows and for explanatory purposes the traffic data volume shall be described using a scale from 1 to 5 according to the following table:

| Value | Traffic Data Volume |
|---|---|
| 1 | Low |
| 2 | Moderate |
| 3 | Average |
| 4 | Sustained |
| 5 | High |

Figure 2A:
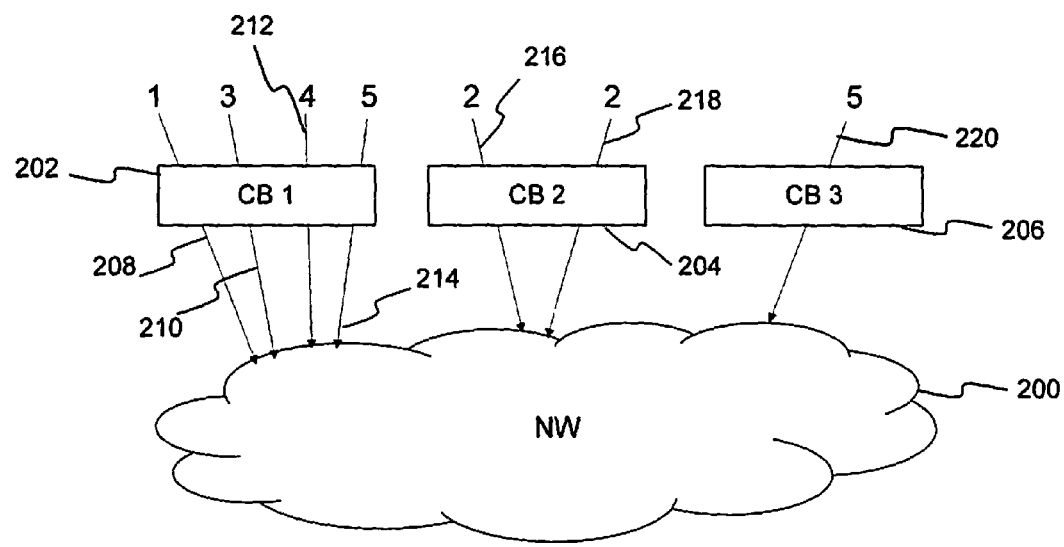
FIG. 2 shows connections moved among connection boards

FIG. 2 shows connections being moved among connection boards according to the invention. In FIG. 2a a number of connections 208-220 which are established over a number of connection boards 204-206 are shown. The connection boards 204-206 can be, for example, the ones shown in FIG. 1. It is assumed that the connection boards have equal or similar traffic data volume capacity. As shown in FIG. 2a, there are four established connections towards a network 200 over connection board 202. These connections 208, 210, 212 and 214 handle a traffic data volume value of 1, 3, 4 and 5 accordingly. Thus, the total traffic data volume handled by connection board 202 is 13 as it is the sum of the traffic data volume values of each connection. Similarly the total traffic data volume handled by connection board 204 is 4 due to the connections 216 and 218. The total traffic data volume handled by connection board 206 is 5 due to the connection 220. The traffic data volumes are shown in FIG. 2a at the beginning of the lines representing the connections 208-220. A measuring unit can be used to measure the total traffic data volume, for example, Erlang (E).

Figure 2B:
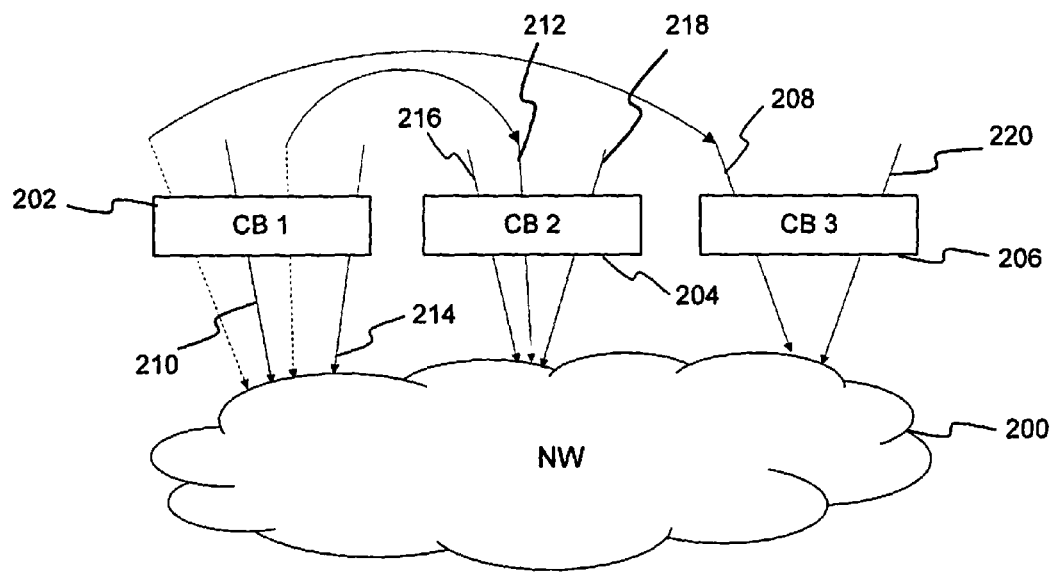

Taking into account the total traffic data volume of each connection board it is observed that connection board 202 has the highest total traffic data volume and connection board 204 the lowest. As mentioned before, according to the invention, the existing connections are re-distributed among the connection boards in order to minimize the difference between connection boards 202 and 204 and also to balance the total traffic data volume among all connection boards. Balancing the total traffic data volume means that all boards share a similar traffic data volume but not necessarily exactly the same. For this purpose, as shown in FIG. 2b, connection 212 is moved from connection board 202 to connection board 204. The new total traffic data volumes over each connection boards are 9 over board 202, 8 over board 204 and 5 over board 206. The data volumes are still not considered to be balanced among the boards since there are still connections which, if they are moved among the boards, a better distribution of the traffic data volume will occur. For this reason, as also shown in FIG. 2b, connection 208 is moved from connection board 202 to connection board 206. In the end of this process it is observed that the total traffic data volumes among the connections boards are 8, 8 and 6 and it is also observed that there is no existing connection which, if moved could provide a better balance of the total traffic data volumes among the connection boards. The objective of having similar total traffic data volumes among all available boards is thus achieved and the process stops.

In another embodiment, the connection boards shown in FIG. 2 do not have the same traffic data volume capacities. For example, connection boards 202 and 206 may have the same traffic data volume capacity and connection board 204 may have a smaller capacity than the other two. For this reason a board factor can be introduced. The board factor can be considered to be a traffic data volume factor since it can be used to determine a ratio of the capacities of the connection boards which are used. In this embodiment the board factor is the ratio between the capacity of the higher capacity board and the capacity of the lower capacity board. The board factor is determined when a pool of connection boards is used to host connections between clients and servers or between peers. When it is known what connection boards are available in the pool the board factor can be determined based on the capacities of the available boards. The board factor can be changed in case new connection boards with different capacities are inserted in the pool.

Also in the case of different capacity connection boards the re-distribution mechanism shown in FIG. 2 can be applied. In this case though the mechanism is adjusted and so the calculation of the total traffic data volumes over the connection boards and more specifically over the connection boards with the least capacity is different. For explanatory reasons, and as an example, it is considered that the board factor is 3. The board factor is used to multiply the total traffic load of the least capacity connection board. In the case shown in FIG. 2a the total traffic volume of connection board 204 is 12 since the traffic volume of connections 216 and 218 is multiplied by the board factor which is 3. Based on this calculation the re-distribution mechanism described before is applied. Any new traffic data volume which may occur on connection board 204 is always multiplied by the board factor in order to calculate the total traffic data volume of board 204.

In case of different capacity connection boards the total traffic data volume over the connection boards can be adjusted by multiplication with a factor representing the reciprocal capacity.

The reason for the introduction of the board factor is the following. As mentioned before, an objective of the proposed invention is to balance the total traffic data volume among the connection boards by moving connections from over-loaded boards to under-loaded boards. In general connection boards with low capacity are less preferred compared to connection boards with high capacity when it comes to hosting of connections. This preference can be due to the fact that e.g. fewer high capacity connection boards than low capacity ones are needed in order to host the same traffic data volume. The multiplication of the total traffic load of the least capacity connection board with the board factor results, artificially, in a higher total traffic data volume. As mentioned before, the re-distribution mechanism foresees moving of connections from connection boards with higher volume to ones with lower volume. By increasing the total traffic data volume hosted by the least capacity connection board using the board factor reduces the possibility that connections are moved to this specific board when executing the re-distribution mechanism is reduced.

Figure 3:
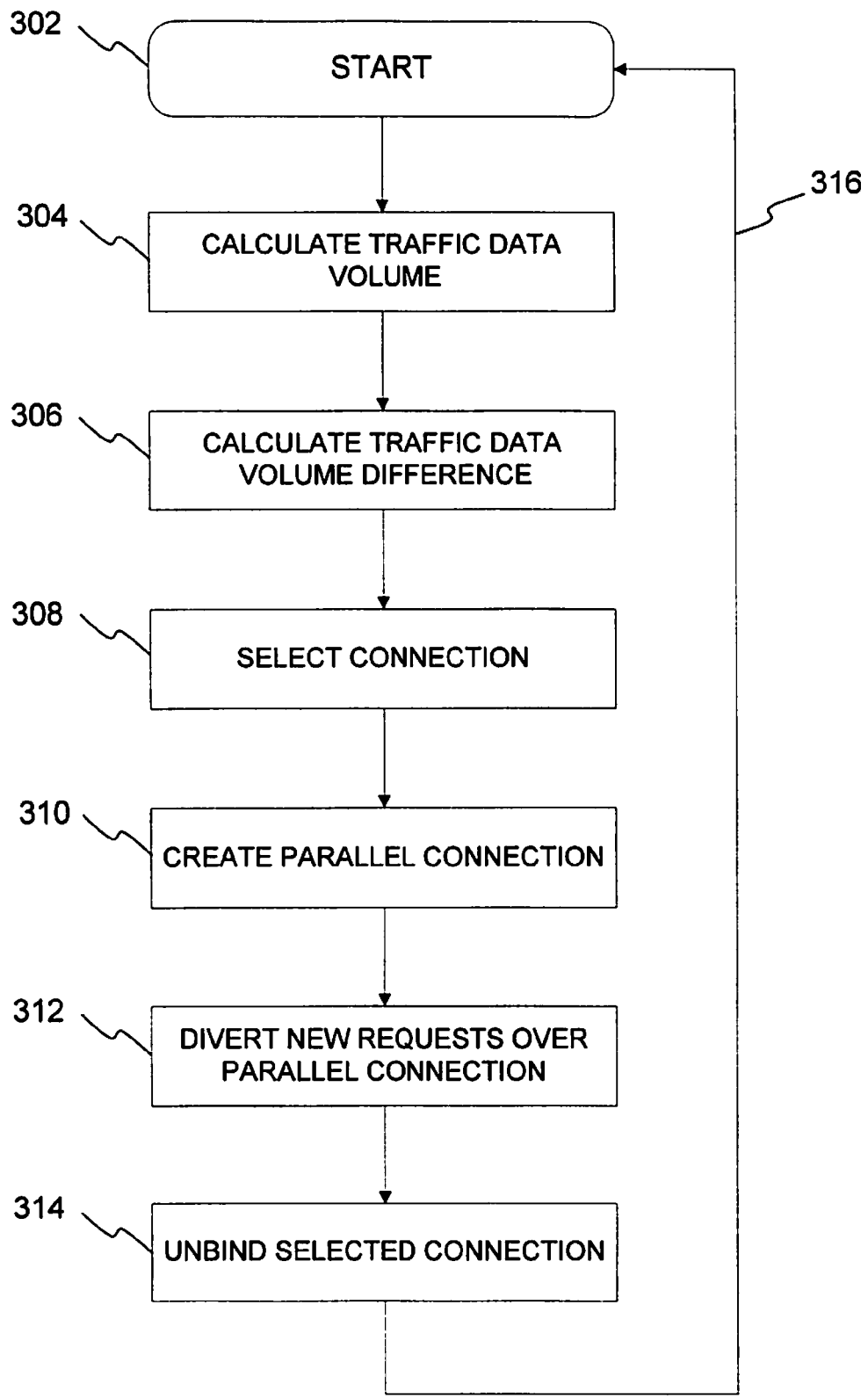
FIG. 3 shows a flow diagram of a method for connection re-distribution

FIG. 3 shows a flow diagram of the re-distribution method according to the invention. In step 302 the method is started. The method can be started automatically upon e.g. expiration of a timer. It can start periodically in specific time frames. In step 304 the total traffic data volume of the connection boards is measured. Based on the measurement it can be determined which connection boards have the highest and the lowest total traffic data volume. In step 306 the difference between the highest and the lowest total traffic data volumes is calculated. Based on this difference, in step 308, a connection is selected to be moved from the board having the highest total traffic to e.g. the board having the least total traffic data volume. Alternatively, multiple connections may be selected to be moved in parallel. As mentioned before, the goal of moving the connection is to minimize the calculated difference and balance the total traffic data volumes among all available connection boards. For this purpose, in step 308, more than one connection may be selected to be moved. In general at first a connection is moved from the board having the highest total traffic to the board having the least total traffic data volume. Nevertheless if further connections are chosen to be moved, it may happen that these will be moved among boards other than the ones with the most and the least total traffic data volume, if that better serves the purpose of balancing the loads over the connection boards.

Further, in step 310, and after one or more connections have been chosen to be moved in step 308, a new parallel connection is created over the connection board towards which the selected connection will be moved. A new parallel connection is created for each one of the connections selected to be moved. Once the parallel connections are created all new service requests are directed towards these new parallel connections, as shown in step 312. In the meantime, the connections selected to be moved remain until all ongoing service requests or any other type of traffic is terminated. The new connections are called parallel because they are created and maintained for some time in parallel with the connections selected to be moved. Once service requests or any other type of traffic is terminated over one or more of the connections to be moved then these connection or connections are unbound in step 314. The mechanism described can be executed as a loop as shown by arrow 316 by starting again in step 302. Steps 310, 312 and 314 can be considered to comprise the moving of a selected connection from one connection board to another. Since no disruption of ongoing connections occurs during the process of re-distributing the connections and especially during the process of moving them, as described in steps 310, 312 and 314, it can be considered that the proposed mechanism can be realized without affecting ongoing operations. The mechanism described can be applied both in the case where all connection boards have the same traffic data volume capacity or where they have different traffic data volume capacities.

Figure 4:
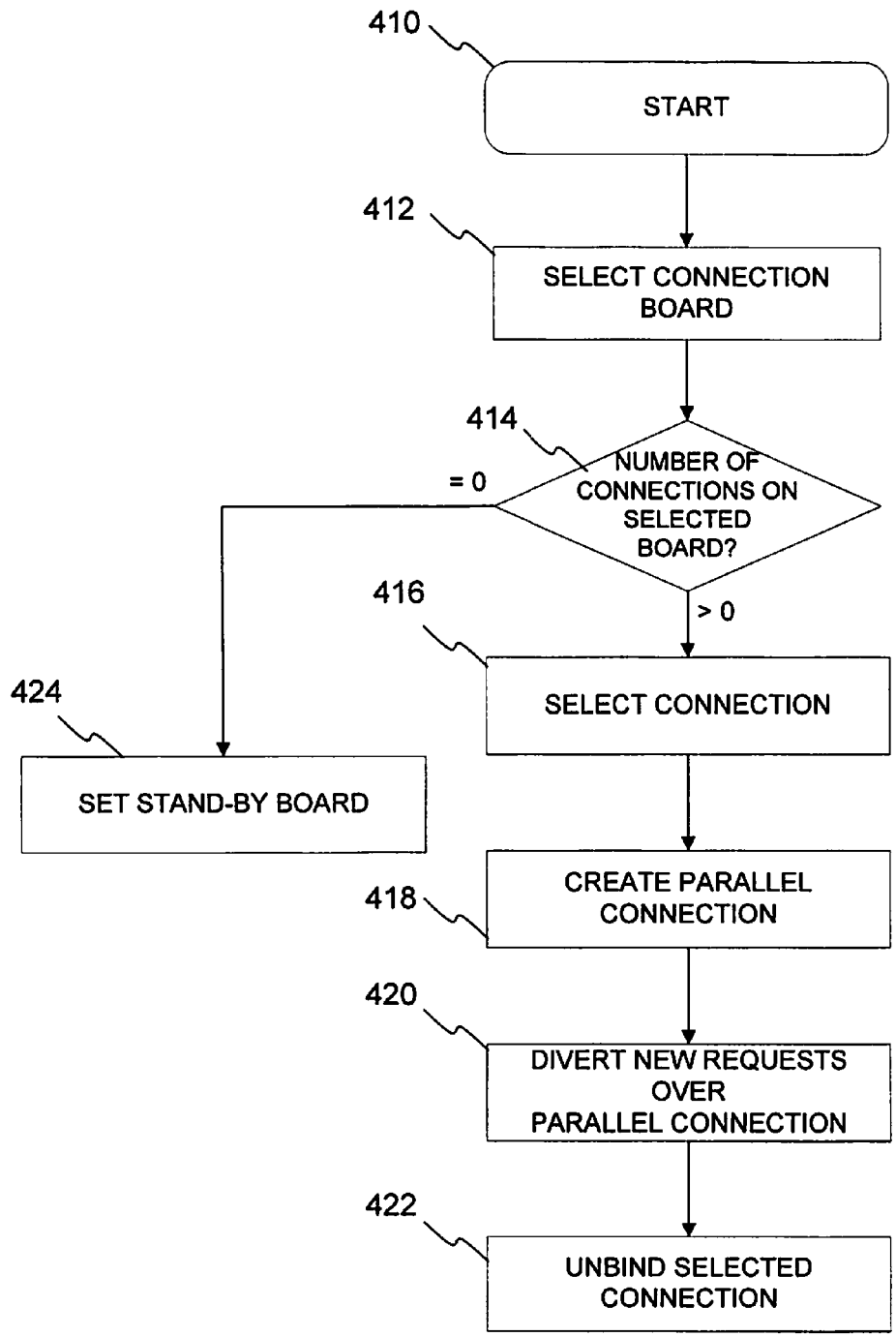
FIG. 4 shows a flow diagram of an embodiment of the proposed method

In an embodiment of the current invention, one of the connection boards in the pool can be selected as a stand-by board. The selection can be made either before the start of the re-distribution method described above or after the method is ended. A flow diagram of this embodiment is shown in FIG. 4. In step 410 the stand-by board selection is started. Within the pool of available connection boards, the one with the least number of established connections is selected in step 412. In case all the available boards have the same traffic load capacity then only the number of established connections influences the selection of the connection board. In case there are connection boards with different traffic load capacities then the selection can be based on this factor and then the connection board with the least capacity, and potentially with the least number of established connections, is selected in step 412. The least number of connections may also mean that a selected connection board hosts no connections at all. This is checked in step 414. If the number of connections hosted on the selected connection board is 0 then this board is set as a stand-by board in step 424. If the check of step 414 shows that the number of connections is greater than 0 then a procedure of moving all established connections from the selected board to other boards is started in step 416. In this step a first connection to be moved is selected.

Further steps 418, 420 and 422 are executed as described for steps 310, 312 and 314 in FIG. 3. The procedure of steps 414 to 422 as described can be repeated until there is no established connection left on the selected connection board. Once this is achieved and the check of step 414 shows that there are no more established connections then as mentioned above, in step 424 the selected connection board is set as a stand-by board.

There can be two benefits from setting a connection board as a stand-by connection board. First, this board can be used in case a failure of one of the other connection boards occurs. In this case connections can be transferred from the connection board where the failure occurs towards the stand-by connection board. Second, the selection of a stand-by board provides the possibility to omit a less powerful, in terms of capacity or performance, connection board from a pool of connection boards.

Figure 5:
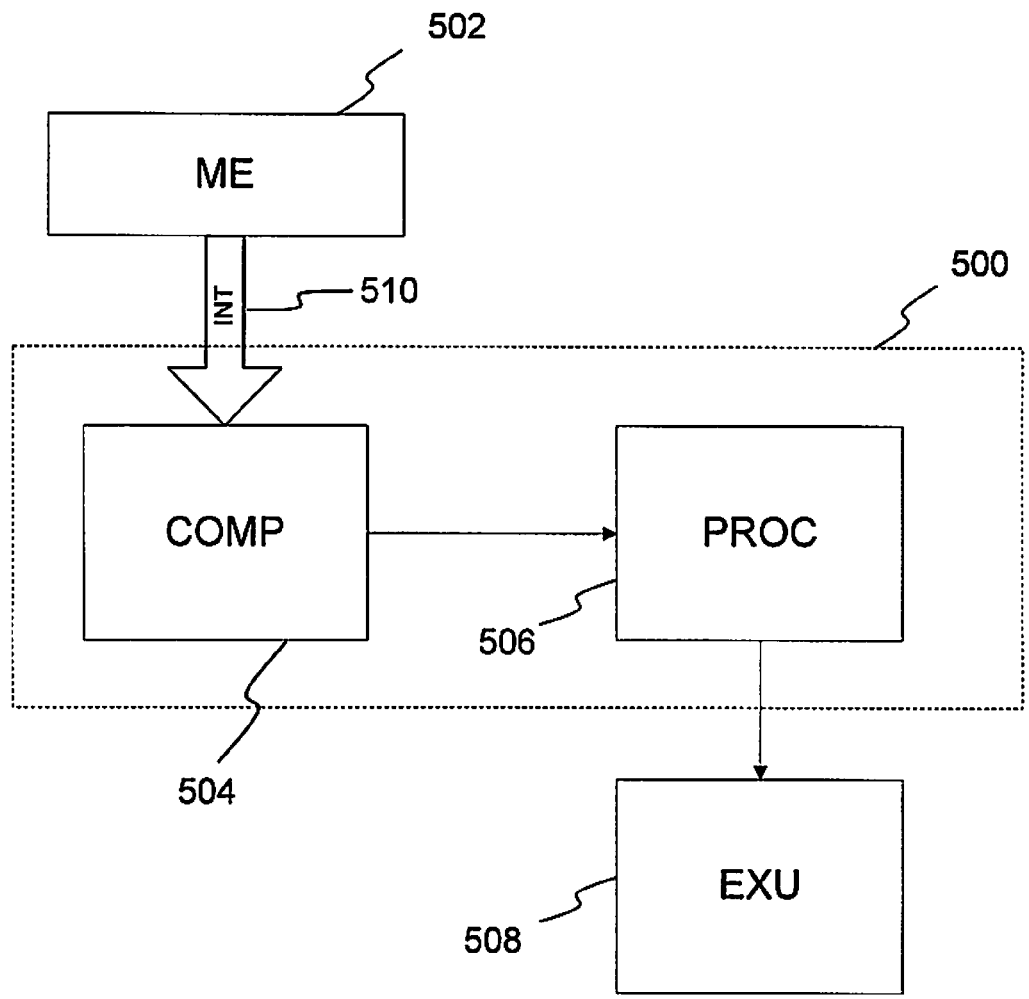
FIG. 5 shows a device which is adapted to perform the proposed method

The invention can also be embodied in a device which can be adapted to perform any embodiments of the proposed method as described above. An embodiment of such a device is shown in FIG. 5. The device 500 comprises a comparator 504 which is adapted to compare two or more total traffic data volumes hosted by two or more connection boards accordingly. The total traffic data volumes can be measured by a measuring entity 502 which can be connected to the connection boards. The measurement of the traffic data volume hosted by each connection board can be obtained by an interface 510 implemented in the device 500. The measuring entity 502 can be implemented separately outside the device 500. Alternatively it can be implemented as part of the device 500 (not shown in the figure). The comparison performed by the comparator 504 aims to determine the difference between the measured total traffic data volumes and by that to identify which connections boards handle the most and the least data volumes. The result of the comparison is communicated to a processor 506 which is also part of the device 500. The processor 506 is adapted to invoke a procedure for re-distributing the existing connections over the connection boards whose traffic data volumes were measured by the measuring entity 502. The appropriate procedure is decided by the processor and can be invoked from an execution entity 508. The execution entity 508 can be implemented outside the device 500, as shown in FIG. 5, or inside the device 500 (not shown in the figure). The execution entity 508 can also be adapted to execute the invoked procedure. Furthermore the execution entity 508 may include more than one procedure for distributing the connections. One of these procedures can be, for example, the re-distribution mechanism described before. The processor 506 can invoke an appropriate procedure which will determine which connections will be moved in order to better distribute the traffic data volumes over the connection boards, based on the input provided by the comparator.

The device 500 can be further adapted to perform the selection of a connection board as a stand-by board.

A device like the one shown in FIG. 5 could, for example, be implemented in or next to a client, e.g. a router or a node in a telecommunication network. In this sense the device could be implemented inside the connection distributor shown in FIG. 1.

The above embodiments admirably achieve the objects of the invention. However, it will be appreciated that departures can be made by those skilled in the art without departing from the scope of the invention which is limited only by the claims.

The invention claimed is:

1. A method in a telecommunications network for distributing a plurality of connections towards a receiving domain, wherein the plurality of connections are established over at least two connection entities, each connection entity handling traffic being associated to the plurality of connections, wherein an initial procedure distributes the plurality of connections among the connection entities, the method comprising the steps of:
   determining for each of the at least two connection entities a traffic load associated with the plurality of connections over each respective connection entity,
   comparing the traffic loads associated with the connections over the at least two connection entities,
   invoking a procedure for adapting the distribution of the connections according to the comparison,
   wherein the procedure for adapting the distribution of the plurality of connections comprises moving at least one connection established over a first of the at least two connection entities to a second of the at least two connection entities, and
   wherein the moving of the at least one connection comprises the steps of:
       establishing a further connection over the second connection entity, where the further connection of the second connection entity is created and maintained in parallel with the at least one connection of the first connection entity,
       transmitting new service requests over the further connection of the second connection entity, and
       releasing the at least one connection of the first connection entity once ongoing service requests are completed, wherein a traffic volume factor determines a traffic capacity of each connection entity and the traffic volume factor adjusts the procedure for adapting the distribution of the plurality of connections.

2. The method according to claim 1, wherein the plurality of connections transmit service requests to the receiving domain.

3. The method according to claim 1, wherein the receiving domain comprises a server database.

4. The method according to claim 1, wherein the invocation of the procedure for adapting the distribution of the plurality of connections is initiated after expiration of a timer.

5. The method according to claim 1, wherein the procedure for adapting the distribution of the plurality of connections comprises minimizing a difference between the traffic loads associated with the plurality of connections over each of the at least two connection entities.

6. The method according to claim 1, wherein the procedure for adapting the distribution of the at least two connections comprises selecting at least one third connection entity as a stand-by connection entity, where the at least one third connection entity has least capacity and potentially least number of established connections when compared to the at least two connection entities, wherein the selecting step comprises:
   determining if number of hosted connections on the at least one third connection entity is zero;
   if result of the determining step is yes, then setting the at least one third connection entity as the stand-by connection entity;
   if result of the determining step is no, then starting a procedure of moving all established connections from the at least one third connection entity to the at least two connection entities, wherein the moving step comprises steps of:
  establishing a further connection over one of the at least two connection entities, where the further connection of the one of the at least two connection entities is created and maintained in parallel with one of the established connections of the at least one third connection entity,
  transmitting new service requests over the further connection of the one of the at least two connection entities, and
  releasing the one established connection of the at least one third connection entity once ongoing service requests are completed, wherein the establishing step, the transmitting step, and the releasing step are repeated until there is no established connection left on the at least one third connection entity.

7. A device in a telecommunications network for distributing a plurality of connections towards a receiving domain, wherein the plurality of connections are established over at least two connection entities, each connection entity handling traffic being associated to the plurality of connections, wherein an initial procedure distributes the connections among the at least two connection entities, the device comprising:
  obtaining, by an interface, for each of the at least two connection entities, a traffic load associated with the plurality of connections over each respective connection entity,
  comparing, by a comparator, the traffic loads associated with the plurality of connections over at least two connection entities, obtained by the interface, and
  invoking, by a processor, a procedure for adapting the distribution of the plurality of connections according to the comparison performed by the comparator, wherein the processor invokes the procedure for adapting the distribution of the plurality of connections by moving at least one connection established over a first of the at least two connection entities to a second of the at least two connection entities, and
  wherein the processor is adapted to move the at least one connection by:
    establishing a further connection over the second connection entity, where the further connection of the second connection entity is created and maintained in parallel with the at least one connection of the first connection entity,
    transmitting new service requests over the further connection of the second connection entity,
    releasing the at least one connection of the first connection entity once ongoing service requests are completed, and
    using a traffic volume factor to determine a traffic capacity of each connection entity, wherein the traffic volume factor adjusts the procedure for adapting the distribution of the connections.

8. The device according to claim 7, wherein the plurality of connections transmit service requests to the receiving domain.

9. The device according to claim 7, wherein the receiving domain comprises a server database.

10. The device according to claim 7, wherein the processor invokes the procedure for adapting the distribution of the plurality of connections after an expiration of a timer.

11. The device according to claim 7, wherein the processor uses the procedure for adapting the distribution of the plurality of connections for minimizing a difference between the traffic loads associated with the plurality of connections over each of the at least two connection entities.

12. The device according to claim 7, wherein the processor uses the procedure for adapting the distribution of the plurality of connections for selecting at least one third connection entity as a stand-by connection entity, where the at least one third connection entity has least capacity and potentially least number of established connections when compared to the at least two connection entities, wherein the processor is adapted to selecting the at least one third connection entity as the stand-by connection entity by:
  determining if number of hosted connections on the at least one third connection entity is zero;
  if result of the determining step is yes, then setting the at least one third connection entity as the stand-by connection entity;
  if result of the determining step is no, then starting a procedure of moving all established connections from the at least one third connection entity to the at least two connection entities, wherein the moving step comprises steps of:
    establishing a further connection over one of the at least two connection entities, where the further connection of the one of the at least two connection entities is created and maintained in parallel with one of the established connections of the at least one third connection entity,
    transmitting new service requests over the further connection of the one of the at least two connection entities, and
    releasing the one established connection of the at least one third connection entity once ongoing service requests are completed, wherein the establishing step, the transmitting step, and the releasing step are repeated until there is no established connection left on the at least one third connection entity.

13. A method in a telecommunications network for distributing a plurality of connections towards a receiving domain, wherein the plurality of connections are established over at least two connection entities, each connection entity handling traffic being associated to the plurality of connections, wherein an initial procedure distributes the plurality of connections among the connection entities, the method comprising the steps of:
  determining for each of the at least two connection entities a traffic load associated with the plurality of connections over each respective connection entity,
  comparing the traffic loads associated with the connections over the at least two connection entities,
  invoking a procedure for adapting the distribution of the connections according to the comparison,
  wherein the procedure for adapting the distribution of the at least two connections comprises selecting at least one third connection entity which has least capacity and potentially with least number of established connections when compared to the at least two connection entities as a stand-by connection entity, wherein the selecting step comprises:
    determining if number of hosted connections on the at least one third connection entity is zero;
    if result of the determining step is yes, then setting the at least one third connection entity as the stand-by connection entity;
    if result of the determining step is no, then starting a procedure of moving all established connections from the at least one third connection entity to the at least two connection entities, wherein the moving step comprises steps of:
  establishing a further connection over one of the at least two connection entities, where the further connection of the one of the at least two connection entities is created and maintained in parallel with one of the established connections of the at least one third connection entity,
  transmitting new service requests over the further connection of the one of the at least two connection entities, and
  releasing the one established connection of the at least one third connection entity once ongoing service requests are completed, wherein the establishing step, the transmitting step, and the releasing step are repeated until there is no established connection left on the at least one third connection entity.

14. A device in a telecommunications network for distributing a plurality of connections towards a receiving domain, wherein the plurality of connections are established over at least two connection entities, each connection entity handling traffic being associated to the plurality of connections, wherein an initial procedure distributes the connections among the at least two connection entities, the device comprising:
  obtaining, by an interface, for each of the at least two connection entities, a traffic load associated with the plurality of connections over each respective connection entity,
  comparing, by a comparator, the traffic loads associated with the plurality of connections over at least two connection entities, obtained by the interface, and
  invoking, by a processor, a procedure for adapting the distribution of the plurality of connections according to the comparison performed by the comparator,
the processor further invokes the procedure for adapting the distribution of the plurality of connections for selecting at least one third connection entity as a stand-by connection entity, where the at least one third connection entity has least capacity and potentially least number of established connections when compared to the at least two connection entities, wherein the processor is adapted to selecting the at least one third connection entity as the stand-by connection entity by:
  determining if number of hosted connections on the at least one third connection entity is zero;
  if result of the determining step is yes, then setting the at least one third connection entity as the stand-by connection entity;
  if result of the determining step is no, then starting a procedure of moving all established connections from the at least one third connection entity to the at least two connection entities, wherein the moving step comprises steps of:
    establishing a further connection over one of the at least two connection entities, where the further connection of the one of the at least two connection entities is created and maintained in parallel with one of the established connections of the at least one third connection entity, transmitting new service requests over the further connection of the one of the at least two connection entities, and
    releasing the one established connection of the at least one third connection entity once ongoing service requests are completed, wherein the establishing step, the transmitting step, and the releasing step are repeated until there is no established connection left on the at least one third connection entity.

* * * * *